United States Patent
Yang et al.

(10) Patent No.: US 11,157,718 B2
(45) Date of Patent: Oct. 26, 2021

(54) FINGERPRINT IDENTIFICATION MODULE AND TERMINAL DEVICE

(71) Applicant: VIVO MOBILE COMMUNICATION CO., LTD., Guangdong (CN)

(72) Inventors: Zidong Yang, Guangdong (CN); Ying Ge, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/648,350

(22) PCT Filed: Aug. 28, 2018

(86) PCT No.: PCT/CN2018/102698
§ 371 (c)(1),
(2) Date: Mar. 18, 2020

(87) PCT Pub. No.: WO2019/052333
PCT Pub. Date: Mar. 21, 2019

(65) Prior Publication Data
US 2020/0218877 A1 Jul. 9, 2020

(30) Foreign Application Priority Data
Sep. 18, 2017 (CN) .......................... 201710841562.2

(51) Int. Cl.
*G06K 9/00* (2006.01)
(52) U.S. Cl.
CPC ................................ *G06K 9/00053* (2013.01)
(58) Field of Classification Search
CPC ................................................ G06K 9/00053
See application file for complete search history.

(56) References Cited

U.S. PATENT DOCUMENTS

| 6,067,368 A | 5/2000 | Setlak et al. |
| 2003/0091220 A1 | 5/2003 | Sato et al. |

(Continued)

FOREIGN PATENT DOCUMENTS

| CN | 205318405 U | 6/2016 |
| CN | 106022253 A | 10/2016 |

(Continued)

OTHER PUBLICATIONS

Baltes, Henry, "Advanced Micro and Nanosystems", vol. 2 , CMOS-MESM, Jan. 1, 2005, 6 pages.

(Continued)

*Primary Examiner* — Stephen G Sherman
(74) *Attorney, Agent, or Firm* — Gearhart Law LLC; David Postolski, Esq.

(57) ABSTRACT

A fingerprint identification module and a terminal device are provided. The fingerprint identification module includes: a decorative ring, provided with a mounting opening; an encapsulation cover, arranged on the decorative ring to close a side of the mounting opening; a fingerprint chip, disposed in the mounting opening, a space is formed between an outer side surface of the fingerprint chip and an inner wall surface of the decorative ring; a protective film, disposed on a side of the fingerprint chip that is towards the encapsulation cover; and a flexible printed circuit (FPC) board, disposed inside the mounting opening, the protective film covers a first partial area of the FPC board, and a second partial area of the FPC board is exposed out of the protective film; the second partial area is an area of the FPC board which is different from the first partial area of the FPC board.

14 Claims, 2 Drawing Sheets

(56) References Cited

U.S. PATENT DOCUMENTS

| | | | |
|---|---|---|---|
| 2013/0092427 A1* | 4/2013 | Wang | H05K 1/0227 |
| | | | 174/260 |
| 2013/0307818 A1 | 11/2013 | Pope et al. | |
| 2014/0352440 A1* | 12/2014 | Fennell | G01N 29/22 |
| | | | 73/632 |
| 2017/0012142 A1* | 1/2017 | Lin | H01L 27/14618 |
| 2017/0076134 A1 | 3/2017 | Lin et al. | |
| 2018/0322326 A1* | 11/2018 | Li | G06K 9/00053 |
| 2019/0095684 A1* | 3/2019 | Yu | G06F 1/1626 |

FOREIGN PATENT DOCUMENTS

| | | |
|---|---|---|
| CN | 106657478 B | 5/2017 |
| CN | 206178867 U | 5/2017 |
| CN | 206353806 U | 7/2017 |
| CN | 206388201 U | 8/2017 |
| CN | 107665335 A | 2/2018 |

OTHER PUBLICATIONS

Ratha, Nalini, Automatic Fingerprint Recognition Systems, Jan. 1, 2004, 4 pages.

Maltoni, Davide, "Handbook of Fingerprint Recognition", 2nd Edition, Jan. 1, 2017, 1 page.

Extended European Search Report dated Oct. 16, 2020, issued in PCT/CN2018/102698.

Search Report and the Written Opinion dated Apr. 2, 2020, issued in PCT/CN2018/102698.

Search Report dated Nov. 16, 2018 issued in Chinese Application No. 201710841562.2.

\* cited by examiner

FINGERPRINT IDENTIFICATION MODULE AND TERMINAL DEVICE

CROSS-REFERENCE TO RELATED APPLICATION

"This application is a U.S. national phase application of a PCT Application No. PCT/CN2018/102698 filed on Aug. 28, 2018, which claims a priority to Chinese Patent Application No. 201710841562.2 filed in China on Sep. 18, 2017, the disclosure of which is incorporated herein in its entirety by reference."

TECHNICAL FIELD

The present disclosure relates to the field of electronic technologies, in particular to a fingerprint identification module and a terminal device.

BACKGROUND

With the rapid development of electronic technologies, users have an increasing demand for terminal devices, and have higher requirements for user experience of the terminal devices. With the continuous development and application of a fingerprint identification technology on the terminal device, the fingerprint identification technology has become one of the important technologies that are concerned much for the usage of terminal device.

A fingerprint identification module is a basic part of the terminal device to realize fingerprint identification. In the related art, due to a gap between the fingerprint identification module and a decorative ring, electrostatic charges may enter through the gap in usage. Since there is no low impedance path in the fingerprint identification module to conduct away the electrostatic charges, the electrostatic charges are prone to be conducted directly to a bottom side of a fingerprint chip and discharged to the fingerprint chip, thereby causing damage to the fingerprint chip.

SUMMARY

A fingerprint identification module is provided in the embodiments of the present disclosure. The fingerprint identification module is applied to a terminal device and includes: a decorative ring, provided with a mounting opening; an encapsulation cover, arranged on the decorative ring to close a side of the mounting opening; a fingerprint chip, disposed in the mounting opening, where a space is formed between an outer side surface of the fingerprint chip and an inner wall surface of the decorative ring; a protective film, disposed on a side of the fingerprint chip that is towards the encapsulation cover; a flexible printed circuit board, disposed inside the mounting opening, where the protective film covers a first partial area of the flexible printed circuit board, a second partial area of the flexible printed circuit board is exposed out of the protective film; the second partial area is an area of the flexible printed circuit board which is different from the first partial area of the flexible printed circuit board.

A terminal device is further provided in the embodiments of the present disclosure. The terminal device includes the fingerprint identification module described above.

BRIEF DESCRIPTION OF THE DRAWINGS

In order to illustrate the technical solutions of the embodiments of the present disclosure in a clearer manner, the drawings required for the description of the embodiments of the present disclosure will be introduced hereinafter briefly. Obviously, the following drawings merely illustrate some embodiments of the present disclosure, and based on these drawings, a person of ordinary skill in the art may obtain other drawings without any creative effort.

DETAILED DESCRIPTION

In order to make the technical problem to be solved, the technical solution and advantages of the present disclosure clearer, a detailed description will be given below with reference to the accompanying drawings and specific embodiments.

Figure 1:
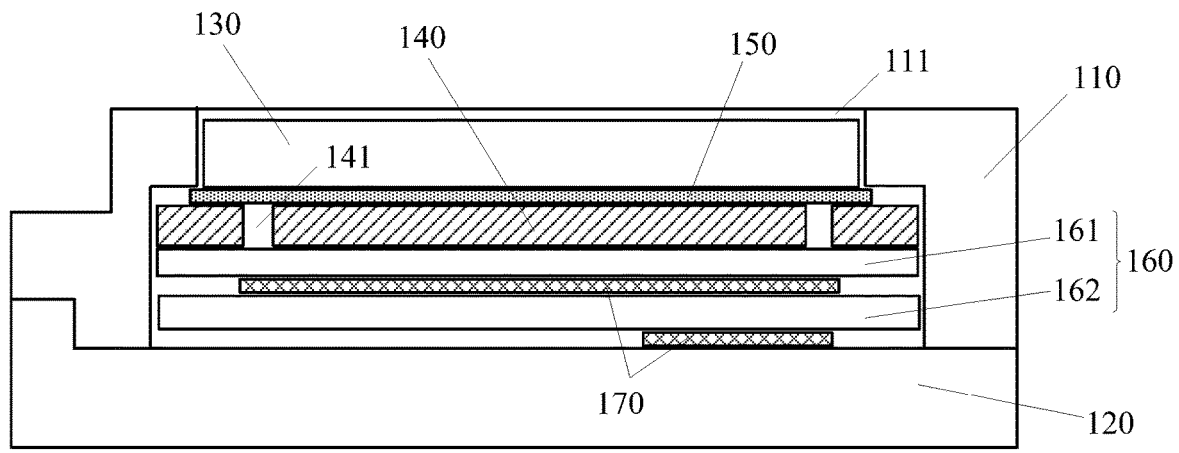
FIG. 1 is a schematic structural diagram of a fingerprint identification module according to an embodiment of the present disclosure.

Referring to FIG. 1, a schematic structural diagram of a fingerprint identification module according to an embodiment of the present disclosure is illustrated.

A fingerprint identification module is applied to a terminal device. The fingerprint identification module may include: a decorative ring 110, provided with a mounting opening 111; an encapsulation cover 120, arranged on the decorative ring 110 to close a side of the mounting opening 111; a fingerprint chip 130, disposed in the mounting opening 111, where a space is formed between an outer side surface of the fingerprint chip 130 and an inner wall surface of the decorative ring 110; a protective film 150, disposed on a side of the fingerprint chip 130 that is towards the encapsulation cover 120; a flexible printed circuit board 140, disposed inside the mounting opening 111, where the protective film 150 covers a first partial area of the flexible printed circuit board 140, a second partial area of the flexible printed circuit board 140 is exposed out of the protective film 150; the second partial area is an area of the flexible printed circuit board which is different from the first partial area of the flexible printed circuit board 140.

In some embodiments of the present disclosure, the encapsulation cover 120 may be a shielding cover configured to shield against external electromagnetic interference and protect the fingerprint identification module. In addition, the encapsulation cover 120 may further be configured to discharge electrostatic charges. The flexible printed circuit board 140 is electrically connected to the fingerprint chip 130. A distance between the flexible printed circuit board 140 and the encapsulation cover 120 is smaller than a distance between the fingerprint chip 130 and the encapsulation cover 120. Wirings are disposed concentratedly in the first partial area of the flexible printed circuit board 140, and the protective film 150 is disposed between the fingerprint chip 130 and the flexible printed circuit board 140 to cover the first partial area, thereby providing insulation protection to the first partial area.

Figure 2:
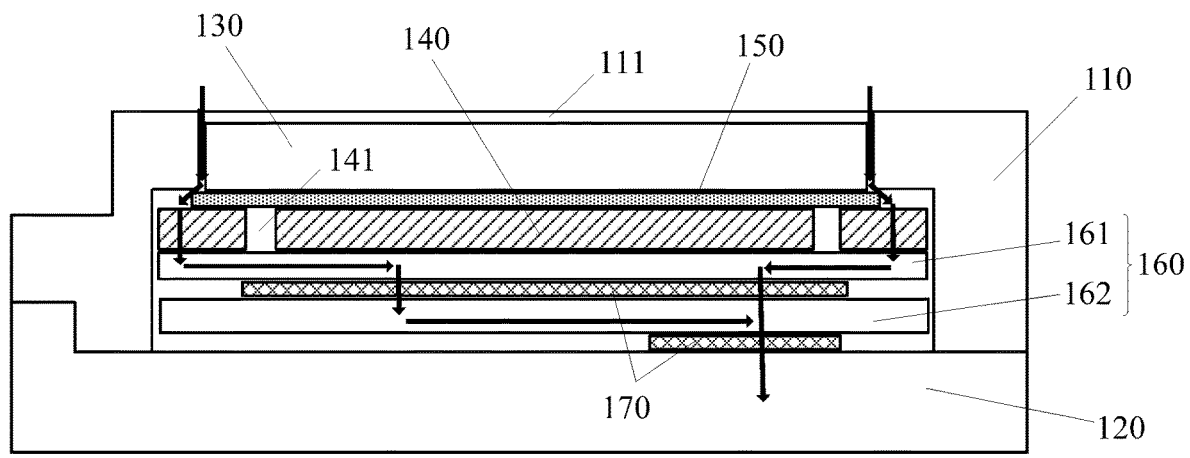
FIG. 2 is a schematic diagram illustrating an electrostatic discharge path in a fingerprint identification module according to an embodiment of the present disclosure.

Referring to FIG. 2, a schematic diagram illustrating an electrostatic discharge path in a fingerprint identification module according to an embodiment of the present disclosure is illustrated. In this embodiment, a path from the space, the second partial area of the flexible printed circuit board 140 to the encapsulation cover 120 forms the electrostatic discharge path. Specifically, electrostatic charges enter via the space between the outer side surface of the fingerprint chip 130 and the inner wall surface of the decorative ring 110, and then a low-impedance path provided by using the second partial area of the flexible printed circuit board 140 enables the electrostatic charges to be conducted to the encapsulation cover 120 via the second partial area and discharged.

In this embodiment, the second partial area of the flexible printed circuit board 140 is used to provide the low-impedance path to form the electrostatic discharge path in the fingerprint identification module, so as to discharge the electrostatic charges having entered the fingerprint identification module, thereby preventing the electrostatic charges from damaging the fingerprinting chip, and improving the reliability of the fingerprint identification module.

In some embodiments, the first partial area corresponds to a middle area of the flexible printed circuit board 140, and the second partial area surrounds the first partial area.

Figure 3:
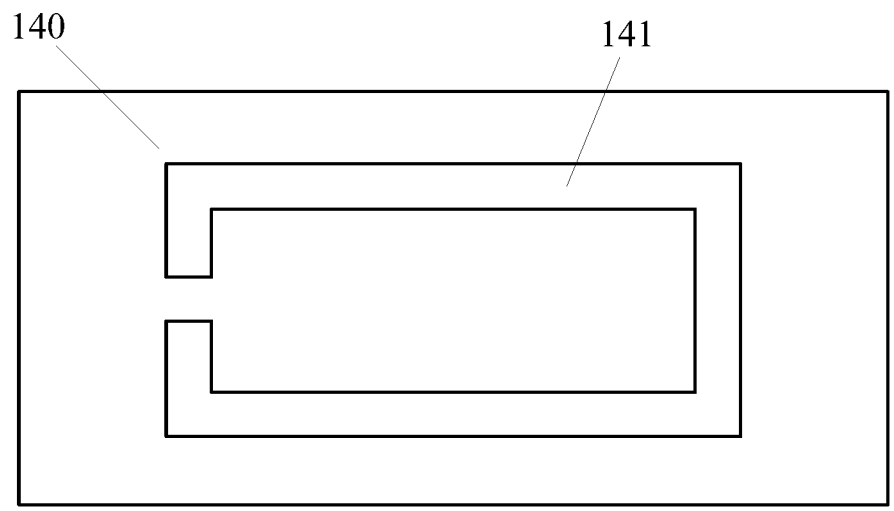
FIG. 3 is a schematic structural diagram of a flexible printed circuit board in a fingerprint identification module according to an embodiment of the present disclosure.

In this embodiment, the electrostatic discharge path is formed by a path from the space, the second partial area of the flexible printed circuit board 140 to the encapsulation cover 120, which may conduct most of the entered electrostatic charges to the encapsulation cover 120. However, considering that there is an electrical connection between a copper foil of the flexible printed circuit board 140 and the fingerprint chip 130, in order to avoid a situation that a small amount of the electrostatic charges may be conducted to the fingerprint chip 130 via the copper foil of the flexible printed circuit board 140 when the electrostatic charges having entered via the space are conducted to the second partial area of the flexible printed circuit board 140, in an embodiment, as shown in FIG. 1 and FIG. 3, a slot 141 passing through two opposite surfaces of the flexible printed circuit board 140 is provided in the flexible printed circuit board 140. In this embodiment, the slot 141 provided in the flexible printed circuit board 140 is configured to form a gap on the flexible printed circuit board 140, so as to block the electrostatic charges flowing through the second partial area of the flexible printed circuit board 140 from being conducted to the fingerprint chip 130 via the copper foil of the flexible printed circuit board 140.

Figure 4:
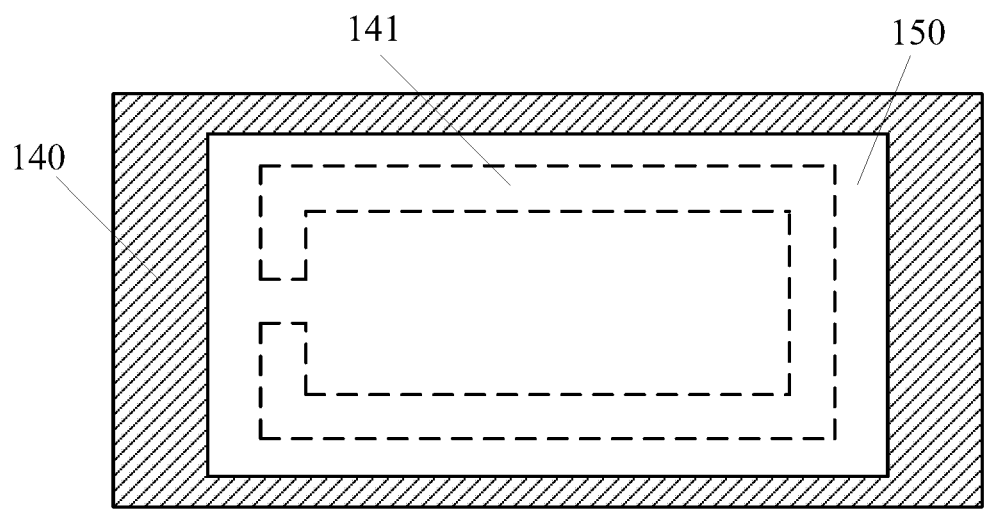
FIG. 4 is a schematic assembly diagram of a flexible printed circuit board and a protective film according to an embodiment of the present disclosure.

In this embodiment, considering a circuit design characteristic of the flexible printed circuit board 140 in the fingerprint identification module, i.e., the wirings of the flexible printed circuit board 140 are disposed concentratedly in the middle area, the slot 141 has a semi-closed annular structure in one embodiment, as shown in FIG. 3 and FIG. 4. In this embodiment, the flexible printed circuit board 140 is partially separated by the slot 141 having the semi-closed annular structure, and the electrostatic charges flowing through the flexible printed circuit board 140 are blocked out of the middle area of the flexible printed circuit board 140 where the wirings are concentrated by using the gap formed by the slot 141 in the flexible printed circuit board 140, thereby preventing the electrostatic charges from being conducted to the fingerprint chip 130 via the flexible printed circuit board 140 and causing damage to the fingerprint chip 130.

Referring to FIG. 1 and FIG. 4, in one embodiment, the protective film 150 covers an opening of the slot 141 that is towards the fingerprint chip 130, to increase an impedance difference between two parts of the flexible printed circuit board 140 which are separated by the slot 141, thereby preventing the electrostatic charges from jumping to the middle area of the flexible printed circuit board 140 via the gap formed by the slot 141 in the flexible printed circuit board 140.

Referring to FIG. 1, in one embodiment, the fingerprint identification module may further include: a reinforcing steel sheet 160 disposed between the flexible printed circuit board 140 and the encapsulation cover 120. In this embodiment, the reinforcing steel sheet 160 is snugly attached to the flexible printed circuit board 140, so as to, on one hand, support the flexible printed circuit board 140, thereby improving the strength of an plug-in position on the flexible printed circuit board 140 to facilitate the overall product assembly, and on the other hand, serve as a ground connection. Specifically, grounding may be achieved by connecting to a main ground of the terminal device via the reinforcing steel sheet 160.

Referring to FIG. 1, in one embodiment, an electrically conductive foam 170 is disposed between the encapsulation cover 120 and the reinforcing steel sheet 160. In this embodiment, the encapsulation cover 120 is connected to the reinforcing steel sheet 160 by the electrically conductive foam 170 which may not only serve as a cushion for protection, but also function as an electric conductor, so that the electrostatic charges flowing through the reinforcing steel sheet 160 may be conducted to the encapsulation cover 120.

Referring to FIG. 1, in one embodiment, the reinforcing steel sheet 160 includes a first steel sheet 161 and a second steel sheet 162. The first steel sheet 161 is snugly attached to a side of the flexible printed circuit board 140 that is away from the fingerprint chip 130, and the second steel sheet 162 is disposed on a side of the first steel sheet 161 that is away from the flexible printed circuit board 140. In this embodiment, the first steel sheet 161 is mainly configured to support the flexible printed circuit board 140 to improve the strength of the plug-in position on the flexible printed circuit board 140, thereby facilitating the overall product assembly. The second steel sheet 162 is configured to be connected to a ground of the motherboard of the terminal device, that is, be connected to the main ground.

Specifically, in one embodiment, the electrically conductive foam 170 is disposed between the first steel sheet 161 and the second steel sheet 162. In this embodiment, the first steel sheet 161 is electrically connected to the second steel sheet 162 via the conductive steel sheet 170 which may double as a cushion for protection.

In the embodiment of the present disclosure, the fingerprint chip 130 may be encapsulated by using a Land Grid Array (LGA) technology.

In the fingerprint identification module according to the embodiment of the present disclosure, the electrostatic discharge path is formed from the space between the outer side surface of the fingerprint chip and the inner wall surface of the decorative ring, the second partial area of the flexible printed circuit board uncovered by the protective film to the encapsulation cover, thereby discharging the electrostatic charges having entered the fingerprint identification module, which prevents the electrostatic charges from damaging the fingerprinting chip and improves the reliability of the fingerprint identification module.

A terminal device is further provided in an embodiments of the present disclosure. The terminal device includes the fingerprint identification module described above.

Since the structure of the main body of the terminal device is the same as or similar to that in the related art, and the structure and principle of the fingerprint identification module are described in detail in the above embodiments, a description of the specific structure of the terminal device is omitted in this embodiment.

In addition, the terminal device may be a mobile phone, a tablet computer, a laptop computer or a personal digital assistant (PDA), etc.

According to the terminal device with the fingerprint identification module in the embodiment of the present disclosure, since the electrostatic discharge path is formed in the fingerprint identification module, the electrostatic charges having entered the fingerprint identification module are conducted and discharged, which may solve the problem of the related art that the fingerprint chip is prone to be damaged by the entered electrostatic charges during usage of the fingerprint identification module. Therefore, the reliability, stability and comfortability of the terminal device may be improved, and the user experience is improved.

It is understood, "an embodiment", "one embodiment" or "some embodiments" mentioned throughout the specification means specific features, structures or characteristics related to the embodiment are included in at least one embodiment or example of the present disclosure. Therefore, "in an embodiment", "in one embodiment" or "in some embodiments" mentioned throughout the specification does not necessarily refer to the same embodiment. In addition, elements, structures, or features described in one drawing or one embodiment of the present disclosure may be combined with elements, structures, or features shown in one or more other drawings or embodiments in any suitable manner.

In addition, in one or more embodiments of the present disclosure, a term such as "include" or "including" is used to indicate the presence of enumerated features or components, but does not exclude the presence of one or more other enumerated features or one or more other components.

In the present disclosure, a term "mounted", "connected", "attached", "fixed", "disposed" or the like should be understood in a broad sense unless otherwise specified and defined, for example, it may be a fixed connection, a detachable connection or a integration; it may be a mechanical connection or an electrical connection; it may be a direct connection, or it may be an indirect connection via an intermediate medium, or it may refer to an internal connection between two components or an interaction between two components. For a person of ordinary skill in the art, the specific meanings of the above term in the present disclosure may be understood according to specific contexts.

In addition, in the embodiments of the present disclosure, a relational term such as first and second is only used to distinguish one entity or operation from another entity or operation, and does not necessarily require or imply that there is such an actual relationship or order between these entities or operations.

The above are merely optional implementations of the present disclosure, it should be appreciated that a person of ordinary skill in the art may make further modifications and improvements without departing from the principle of the present disclosure, and these modifications and improvements shall also fall within the scope of the present disclosure.

What is claimed is:

1. A fingerprint identification module, applied to a terminal device, comprising:
 a decorative ring, provided with a mounting opening;
 an encapsulation cover, arranged on the decorative ring to close a side of the mounting opening;
 a fingerprint chip, disposed in the mounting opening, wherein a space is formed between an outer side surface of the fingerprint chip and an inner wall surface of the decorative ring;
 an insulative protective film, disposed on a side of the fingerprint chip that is towards the encapsulation cover;
 a flexible printed circuit board, disposed inside the mounting opening, wherein the insulative protective film covers a first partial area of the flexible printed circuit board, a second partial area of the flexible printed circuit board is exposed out of the insulative protective film;
 the second partial area is an area of the flexible printed circuit board which is different from the first partial area of the flexible printed circuit board;
 a reinforcing steel sheet, disposed between the flexible printed circuit board and the encapsulation cover, wherein the reinforcing steel sheet comprises a first steel sheet and a second steel sheet, the first steel sheet is snugly attached to a side of the flexible printed circuit board that is away from the fingerprint chip, the second steel sheet is disposed on a side of the first steel sheet that is away from the flexible printed circuit board.

2. The fingerprint identification module according to claim 1, wherein the first partial area corresponds to a middle area of the flexible printed circuit board, the second partial area surrounds the first partial area.

3. A terminal device, comprising the fingerprint identification module according to claim 2.

4. The fingerprint identification module according to claim 1, wherein the flexible printed circuit board is provided with a slot passing through two opposite surfaces of the flexible printed circuit board.

5. The fingerprint identification module according to claim 4, wherein the slot has a semi-closed annular structure.

6. A terminal device, comprising the fingerprint identification module according to claim 5.

7. The fingerprint identification module according to claim 4, wherein the insulative protective film covers an opening of the slot that is towards the fingerprint chip.

8. A terminal device, comprising the fingerprint identification module according to claim 7.

9. A terminal device, comprising the fingerprint identification module according to claim 4.

10. The fingerprint identification module according to claim 1, wherein an electrically conductive foam is disposed between the encapsulation cover and the reinforcing steel sheet.

11. A terminal device, comprising the fingerprint identification module according to claim 10.

12. The fingerprint identification module according to claim 1, wherein an electrically conductive foam is disposed between the first steel sheet and the second steel sheet.

13. A terminal device, comprising the fingerprint identification module according to claim 12.

14. A terminal device, comprising the fingerprint identification module according to claim 1.

* * * * *